No. 646,279. Patented Mar. 27, 1900.
J. A. GRANT.
POULTRY COOP.
(Application filed Oct. 13, 1899.)
(No Model.)
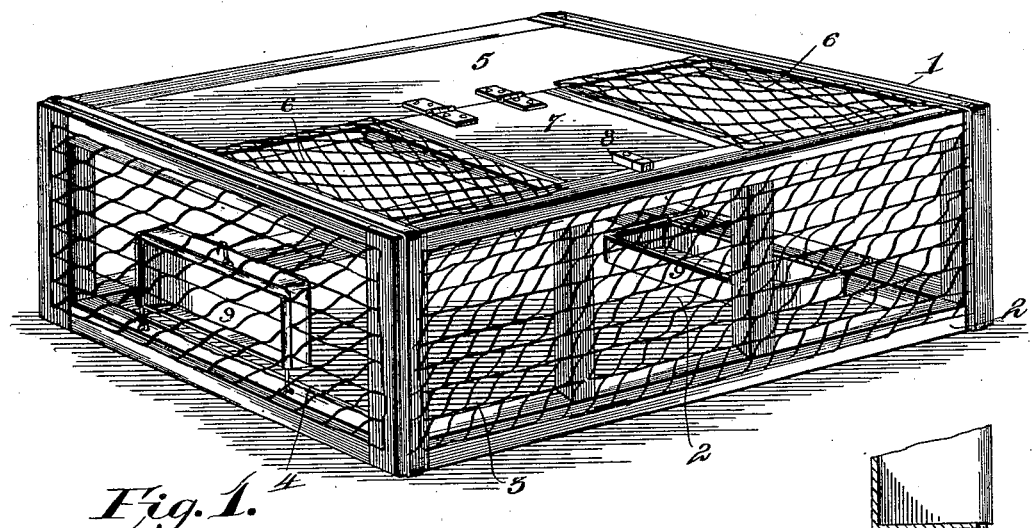
Fig. 1.
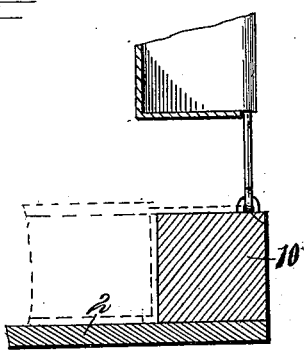
Fig. 3.
Fig. 2.
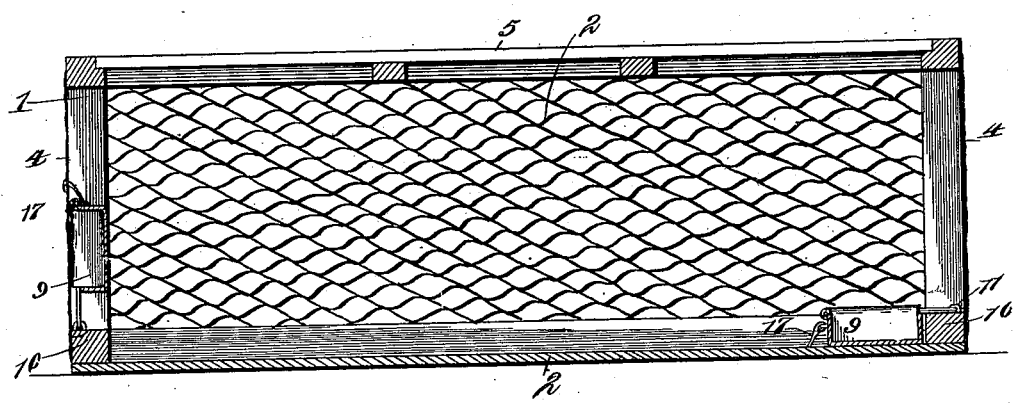
Witnesses
C. H. Walker
H. J. Riley
J. A. Grant, Inventor
By his Attorneys,
C. A. Snow & Co.
THE NORRIS PETERS CO., PHOTO-LITHO., WASHINGTON, D. C.

UNITED STATES PATENT OFFICE.

JAMES ABBERT GRANT, OF DRY CREEK, LOUISIANA.

POULTRY-COOP.

SPECIFICATION forming part of Letters Patent No. 646,279, dated March 27, 1900.

Application filed October 13, 1899. Serial No. 733,493. (No model.)

*To all whom it may concern:*

Be it known that I, JAMES ABBERT GRANT, a citizen of the United States, residing at Dry Creek, in the parish of Calcasieu and State of Louisiana, have invented a new and useful Poultry-Coop, of which the following is a specification.

The invention relates to improvements in poultry-coops.

The object of the present invention is to improve the construction of poultry-coops, more especially the means of supplying the poultry with food and water during transit and to provide a folding trough adapted to hold either food or water and capable when not in use of being arranged against the adjacent wall of a coop to exclude filth, whereby the food and water consumed will be clean and the poultry delivered in a healthy condition.

The invention consists in the construction and novel combination and arrangement of parts hereinafter fully described, illustrated in the accompanying drawings, and pointed out in the claim hereto appended.

In the drawings, Figure 1 is a perspective view of a poultry-coop constructed in accordance with this invention. Fig. 2 is a longitudinal sectional view, one of the troughs being in position for use and the other being arranged in a vertical position against the adjacent end of the coop. Fig. 3 is an enlarged detail sectional view illustrating the manner of mounting the troughs.

Like numerals of reference designate corresponding parts in all the figures of the drawings.

1 designates a poultry-coop provided with a stout wooden frame and having an imperforate or solid bottom 2 and open-work sides and ends 3 and 4, of woven wire or other suitable material. The top of the coop is preferably provided with a solid rear section 5 and open-work front sections or portions 6, located at the ends of the coop at opposite sides of a door 7, hinged at its inner end to the solid portion 5 of the top and provided at its front or outer end with a suitable fastening device, preferably a spring-catch 8. The coop, which is supported or reinforced at its ends by metal straps, may, if desired, be constructed in any other manner.

At each end of the coop is arranged a trough 9, and this receptacle, which is located within the coop adjacent to one of the bottom bars 10 of the frame, has its upper edges arranged in the same horizontal plane as the upper face of the bar 10 when it is in a horizontal position for use, as illustrated at the right-hand end of Fig. 2 of the drawings. The trough or receptacle 9, which is of the same depth as the bar 10, is adapted to contain either food or water and is connected with the said bar 10 by hinges 11, consisting of staples 12 and arms 13, extending horizontally from the top of each of the troughs or receptacles when the same is in a horizontal position and provided at their outer ends with loops, which are linked into the staples. The arms consist of extensions of a strengthening or stiffening wire extending around the upper edges of the trough or receptacle and arranged within a suitable bead.

When the trough is arranged in a vertical position directly above the bar 10, it is out of the way and does not consume any of the bottom 2, and its top is turned outward against the end of the coop, so that the filth will be excluded from the said trough or receptacle and cannot become mixed with the food or water consumed by the poultry, as is the case when such food is placed upon the bottom of the coop and the water is held by a pan or similar receptacle which always remains upright in the coop. The trough or receptacle is retained in the position shown at the left-hand end of Fig. 2 of the drawings by means of a hook 17, which is adapted to engage the woven wire which forms the end of the coop; but any other suitable fastening device may be provided to accomplish this result.

It will be seen that the receptacles or troughs, which are arranged within the coop and which may be placed at any desired point on the sides or ends, are adapted to be arranged in a horizontal position upon the bottom of the coop while the contents thereof are being fed and watered and that the said receptacles may be swung upward from a horizontal to a vertical position with their open tops against the adjacent walls of the coop to exclude filth from them and insure absolute cleanliness in feeding the poultry. It will also be apparent that when the troughs are swung upward they are arranged in the same plane as the adjacent bottom bars of the frame and do not consume any of the floor or bottom space of the coop and that they are securely held in such position.

The coop is especially adapted for the shipment of poultry, and it will be clear that the latter will be delivered at market or other destination in a healthy and better condition than when no provision is made for excluding filth from the food and water consumed by the poultry.

Changes in the form, proportion, size, and the minor details of construction within the scope of the appended claim may be resorted to without departing from the spirit or sacrificing any of the advantages of this invention.

What is claimed is—

The combination with a coop provided with a frame having a horizontal bottom bar located adjacent to the inner face of the woven wire or other material forming the sides of the coop, of a receptacle located within the coop and hingedly connected with the frame at the upper face of the bottom bar 10, adjacent to the outer edge of the same and capable of swinging upward and downward to arrange it in a horizontal position on the bottom of the coop, contiguous to the bottom bar 10 and to fold it against the side of the coop at a point directly above the said bar 10, whereby it will be out of the way and will not consume any of the floor-space of the coop, when it is not in use, substantially as described.

In testimony that I claim the foregoing as my own I have hereto affixed my signature in the presence of two witnesses.

JAMES ABBERT GRANT.

Witnesses:
JAMES T. KENT,
WILLIAM A. KENT.